United States Patent [19]

Citron

[11] 4,295,463

[45] Oct. 20, 1981

[54] FLEXIBLE V-SHAPED SOLAR TRACKING CONCENTRATING SOLAR ENERGY COLLECTOR

[76] Inventor: Jeffrey M. Citron, 6111 E. 15th St., Tucson, Ariz. 85711

[21] Appl. No.: 960,121

[22] Filed: Nov. 13, 1978

Related U.S. Application Data

[63] Continuation-in-part of Ser. No. 680,389, Apr. 26, 1976, abandoned.

[51] Int. Cl.$^3$ ................................................. F24J 3/02
[52] U.S. Cl. ..................................... 126/425; 126/439
[58] Field of Search ............... 126/424, 425, 438, 439; 350/299

[56] References Cited

U.S. PATENT DOCUMENTS 2,907,318 10/1959 Awot ..................................... 126/438
3,923,381 12/1975 Winston .............................. 126/439

Primary Examiner—Carroll B. Dority, Jr.

[57] ABSTRACT

The present invention comprises a concentrating solar energy collector of multiple V-shaped troughs formed from complementary ridges of inverted V-shape. If the angles and spacing of the ridges are properly chosen, V-troughs of any desired concentration ratio can be constructed. Additionally, if the reflective material of the ridges is provided to be of a flexible nature at specific places, and the support for the ridges is constructed to provide tension on the ridge structure, slippage at its flexible areas, and laterally shifting capability, the axes of the ridges can be pivoted through a unique flexible shape method of pivoting the ridge structures themselves. When controlled by a solar-sensitive aiming device, this pivoting of the ridges provides the solar tracking of the V-trough axes which is necessary if the V-troughs are to accept all the solar radiation incident on them year-round and concentrate it on the absorbers at their bases. Finally, because of energy losses inherent in the V-shaped design, an embodiment of this collector is described incorporating fluid-conducting means within the ridge structures and in thermal contact with the ridge's side walls. If a cool fluid is circulated through these conducting means, energy lost to the ridge side walls by multiple light reflections and from the warm solar absorber can be recirculated to the absorber, thus substantially increasing the efficiency of this collector.

3 Claims, 8 Drawing Figures

FLEXIBLE V-SHAPED SOLAR TRACKING CONCENTRATING SOLAR ENERGY COLLECTOR

This application is a continuation-in-part of the inventor's prior filed co-pending application: Ser. No. 680,389; filing date Apr. 26, 1976 and now abandoned.

BACKGROUND OF THE INVENTION

The present invention relates to a solar tracking concentrating collector capable of achieving moderately high concentration ratios. Due to its specific, unique design elements, the present invention shows a number of advantages over prior art concentrators.

Most practical prior art concentrators have been curved reflective surface designs like the solar tracking parabolic reflective mirror types, or the primarily stationary curved reflective troughs. Since large curved mirror surfaces must have detailed structural support, or be constructed of materials of sufficient thickness to support their shape, materials expense for the structural requirements of these large area curved reflectors are bound to be relatively high. This is especially true if these reflectors must be exposed to wind loading. Since collectors of the present design utilize flat reflective surfaces which can be supported by gas or linear tension, they are capable of being constructed of materials of considerably thinner guage. These less-expensive materials should provide considerable economic advantage in the construction of solar concentrators where large reflective areas are required. Additionally, since all materials required in the present design are of either a flat sheet or linear nature, many commonly available inexpensive materials should be applicable.

Only solar tracking concentrators have proved able to maintain consistently high concentration ratios throughout yearly solar motions. Since prior art tracking concentrators have been curved reflectors necessitating pivoting of their rigid shapes around an axis, they have required physical spacing between their reflectors to prevent physical interference and shadowing of each other during tracking orientations. However, concentrators of the present design, because of their unique flexible-shape method of tracking orientation, maintain complementary shape and adjacency throughout their range of tracking orientation, thus requiring no intermediate spacing and utilizing collection area more efficiently.

As a consequence of this continuous contiguity of reflector surfaces, concentrators of the present design can easily be housed inside a protective structure with covering glazing . . . an embodiment that provides a number of advantages relative to prior art concentrators. As compared with parabolic reflectors, one of these advantages will be found in the increased life expectancy of receiving tube and reflector surfaces protected by the covering glazing from the abrasive external environment. Protection from external factors may also be afforded to the tracking mechanism by the collector housing and should reduce maintenance and increase useful life. Additionally, it can be expected that a considerable reduction in heat loss from the solar absorbing element will result from having it inside a sealed enclosure.

SUMMARY OF THE INVENTION

A solar tracking concentrating collector is formed by a structure comprised of multiple, parallel ridges having the cross-section of an inverted 'V,' and constructed of material having a highly light-reflective surface facing the complementary parallel adjacent V-shaped troughs formed by these ridges.

The axes of this structure of V-troughs and ridges may easily be pivoted to track the angular movements of the solar image in a unique, flexible-shape method of tracking if specific materials and structural criteria are met. This method of tracking, involving pivoting the ridges around two axes, can be achieved if: (1) support members for the reflective ridges are placed along the ridge's apex and base axes; (2) the reflective material of the ridge walls is provided to be of a flexible nature either wholly or in specific sectional areas at specific places in the ridge structures: (3) provision is made for slippage or rolling of the flexible material of the ridge structures around one or more ridge support members throughout tracking orientations; (4) provision is made at ridge support members for pivoting of the ridge material around the support members throughout tracking orientations; (5) provision is made for tension applied to the reflective material to maintain the rigidity and shape of the ridge structures; (6) provision is made for relative lateral displacements of the sets of ridge, base, and apex support members: (7) provision is made to compensate for ridge base and apex relative lateral displacement by allowing for relative vertical displacement of base and apex support member sets: (8) driving means for impelling this relative lateral displacement of ridge base and apex support members is provided: and (9) a light-sensitive aiming device, with its operative axis mounted to pivot in parallel to the ridge and trough axes throughout tracking orientations, is provided to control the lateral displacement driving means in response to solar angular shift relative to its operative axis, thus effecting solar tracking of the V-trough axes. This angular shifting of the V-trough structure during solar tracking is accomplished in a unique way in which the angle of the V-troughs is flexible and chances throughout the range of their pivotal orientation, changing slightly the V-troughs shapes.

If the ridges are so arranged in the device that there are gaps between their base axes, the V-troughs will be truncated above their intersection points, creating apertures at their bottoms whose width can be chosen to be any proportion of the widths of their upper mouths. If the angles of the ridges and correspondingly the angle of the V-troughs is appropriately chosen, all solar radiation incident on the V-trough mouths and parallel to their axes will pass directly or be reflected through the apertures at their bottoms, except for that proportion of the radiant energy absorbed by the not-perfectly-reflective material of the trough walls.

If solar energy absorbing elements are placed to fill the apertures at the bottoms of such an array of solar tracking V-troughs, it would function to concentrate the solar radiation incident on the V-trough mouths and parallel to their axes onto these absorbing elements, creating a solar tracking concentrating collector. The concentration ratio of such a device would depend on the proportion of the V-trough apertures to their mouths and the reflectivity of the material used for the ridges.

A preferred embodiment of this collector would incorporate fluid-conducting structures within the ridges in thermal contact with the ridge side walls. A cool fluid circulated through these fluid-conducting structures, such as the collector inlet fluid, would then serve to capture energy lost to the trough walls from the warm absorbers at the trough bottoms, and from the multiple light reflections within the troughs, and if subsequently used in the collector's absorber as the main energy transfer fluid, would substantially increase the collector's overall efficiency.

DETAILED DESCRIPTION AND PREFERRED EMBODIMENTS

Figure 1A:
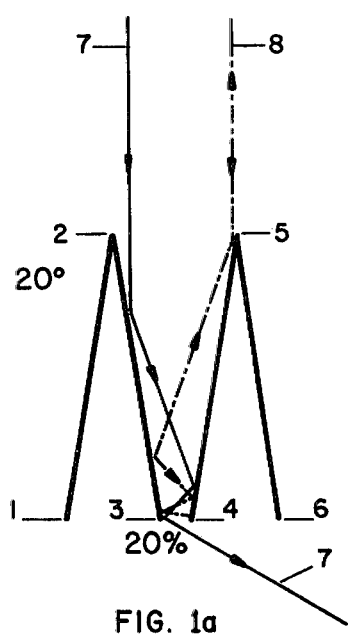
FIGS. 1a–1d show cross-sectional views of a single V-trough as formed by the complementary ridges, and illustrate the principles of light-reflectance that underlie the operation of the mechanism.
Figure 1B:
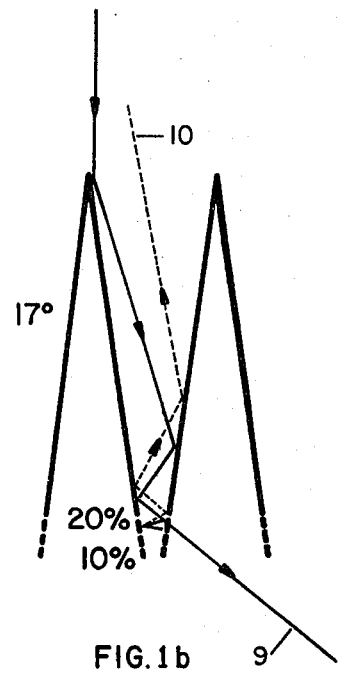
Figure 1C:
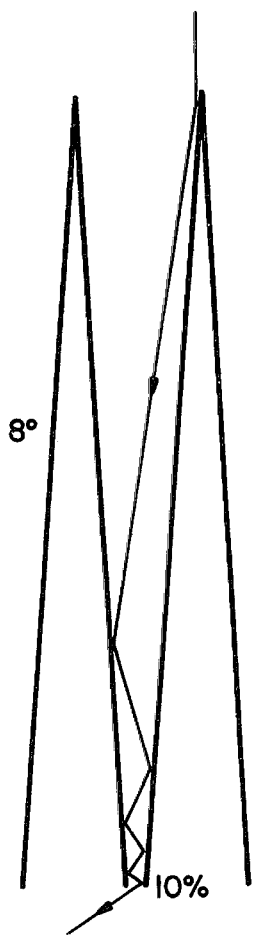

FIG. 1a shows in cross-section the basic V-trough design as formed by two adjacent ridges. In this example the angle formed by the V-trough is 20 degrees, and the proportion of V-trough aperture width '3-4' to V-trough mouth '2-5' is 20 percent. Light ray '7', which falls on the side of the V-trough somewhat down within it, easily passes through the 20 percent aperture, while light ray '8', which falls close to the peak of the ridge, is reflected back out of the V-trough along the same path it entered. Henceforth, this light ray '8', which strikes the V-trough just within its mouth and almost at the apex of the ridge, will be termed the least advantageous ray. FIG. 1b shows that if the V-trough is reduced to an angle below 18 degrees (17 degrees in this drawing), then the least advantageous ray will be passed through the 20 percent aperture (as solid ray '9'), but will be reflected back before reaching a 10 percent aperture (dashed ray '10'). FIG. 1c shows that the least advantageous ray will be passed through a 10 percent aperture if the V-trough is reduced to 9 degrees or less (8 degrees in this drawing).

Figure 1D:
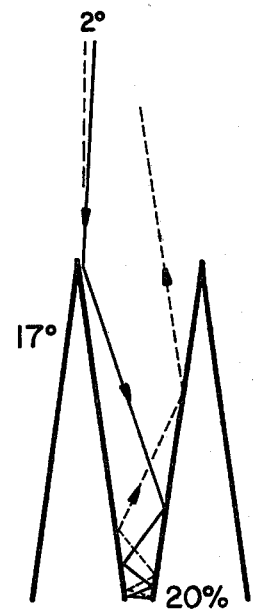

It should be noted that all light rays so far considered in these drawings have arrived parallel to the axis of the V-trough. FIG. 1d shows the case for a 17 degree V where the least advantageous ray deviates by 2 degrees from parallel to the axis of the V-trough. It is seen that this ray is again reflected back above the 20 percent aperture, thus showing the rejection of this mechanism for diffuse sky radiation and its primary dependence on having the axes of the V-troughs aimed to receive direct parallel solar radiation.

Figure 2A:
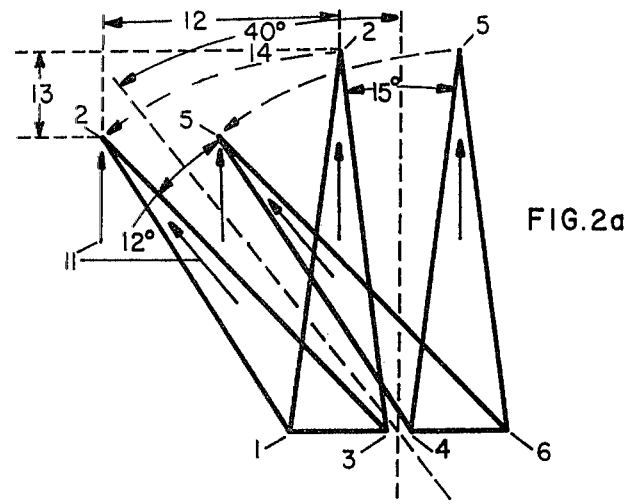
FIGS. 2a and 2b show two possible ways that the V-trough axes can be pivoted to track the solar motion.

FIG. 2a illustrates in cross-section the unique method of pivotal tracking of this V-trough concentrator and serves to indicate the conditions of construction necessary to accomplish it. It will first be observed that the base axes '1,3,4,6' of the ridges shown are closed off by additional wall members which are not a required feature of the basic design, but may be desirable elements in certain embodiments of the collector. Specifically, it will be observable from examination of the drawing that in order for the indicated method of pivotal shifting to be physically realizable, the material of the ridge structures must be capable of slipping or rolling past support members at either the ridge apex base '2,5' or base axes '1,3,4,6' and thus, in an embodiment in which this slippage is realized at the base axes, these base closing walls could be desirable. It is also to be noted that this requirement for slippage at either ridge base or apex axes in no way precludes an embodiment in which slippage of ridge material is provided for at both base and apex axes.

In any case, the requirement for slippage of the ridge material around the support members at one or more of the ridge axes points to the additional requirement that at least partial sections of the reflective material of the ridge structure be of a material of a flexible nature. The exact size and positioning of these required flexible areas of the ridge material will depend on the specific design criteria of the particular V-trough embodiment under consideration. This minimal requirement for flexible ridge sections does not preclude the possibly economically preferable embodiment in which the entire ridge structure is constructed of a flexible reflective material. Materials suitable for this use include a number of bright metallic foils, with aluminum foil as a prime choice due to its low cost and excellent physical properties, as well as other materials such as aluminized Mylar where operating temperatures permit.

Further inspection of FIG. 2a indicates that in order for the illustrated method of pivoting to be effected, a method of pivoting the ridge material around the other ridge support members than those at which the flexible material slippage system is employed, must be provided. Additionally, it will be realized that since the V-trough and ridge mechanism is not a rigid structure, some method of providing tension upon it to maintain its shape throughout tracking orientations and thermal fluctuations must be included. This tension, illustrated by the vector arrows '11' in the drawing, may be accomplished by spring loading upon some of the ridge support members or alternatively, by some form of gas or vacuum pressure directly on the ridge material.

With regard to the actual physical movement involved in the illustrate method of pivotal tracking, two requirements are shown by the drawing. The first involves a relative lateral displacement '12' of the ridge base and apex axes; and the second involves a necessary and corresponding relative vertical displacement '13' of base and apex axes. The driving mechanism to achieve these displacements may be of varying types, but a simple carriage capable of linear horizontal motion may be the most economical means of effecting both lateral and vertical displacement and guidance. Other types of mechanisms capable of such displacement might involve electric motors connected through gears and rods or wires and pulleys to ridge support means. The off-center pivotal shift of 40 degrees '14' shown in FIG. 2a is sufficient to track the solar image in the vertical, North/South direction during its full diurnal and yearly seasonal motion in prime solar collection hours of 8 AM to 4 PM for a concentrator whose V-trough axes are horizontally oriented. The final requirement to achieve solar tracking is that the lateral displacement driving mechanism shall be under the control of an aiming device whose light-sensitive-axis is mounted to pivot with and parallel to the axes of the V-troughs. Many commonly available aiming devices now in use with other solar tracking collectors are applicable to this concentrator.

Consideration of FIG. 2a reveals the interesting fact that as the V-trough axis is shifted to track the sun, the V-angle narrows slightly (15 to 12 degrees in this case). However, since the relation of V-trough mouth '2-5' to aperture '3-4' remains the same, and narrowing of the V-angle only decreases the aperture proportion through which the light will pass, the performance of the device is in no way degraded relative to its intended function. This slight narrowing of the V-angles as well as the slight changes in the V-wall lengths is a resultant of the unique flexible-geometry method of pivoting of the V-troughs during solar tracking orientations.

Figure 2B:
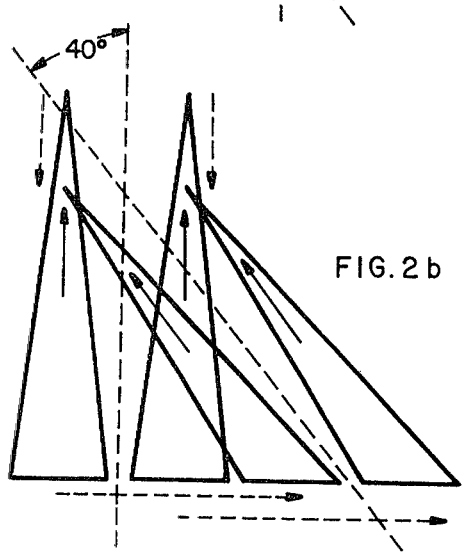

FIG. 2b indicates an alternative method for orientation in which the base axes support members, rather than the apex axes support members, are moved, and reaffirms the same basic construction requirements while pointing to the general flexibility of design of this V-trough concentrator. This flexibility of design relates to the independently variable nature of the various design alternatives, such as which ridge support members slip with respect to ridge reflective material and which are attached, which of apex or base ridge support members are laterally and vertically movable, method of providing tension on ridge material, method of driving vertical and horizontal displacement of ridge axes, etc.

Figure 3:
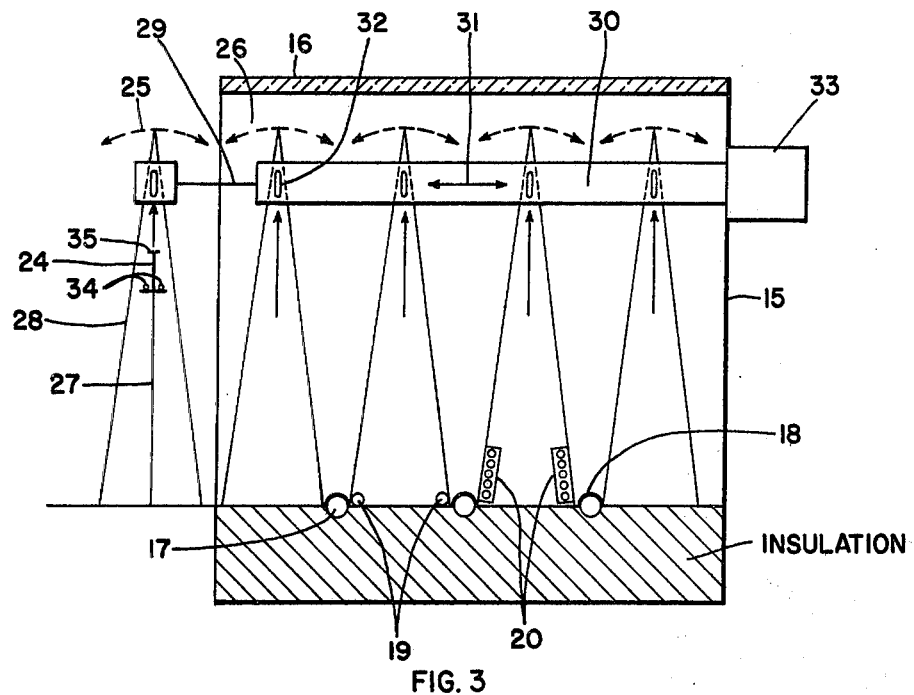
FIG. 3 is a cross-sectional view of the V-trough concentrating collector of this invention.

FIG. 3 is a cross-sectional representation of a V-trough concentrating collector of the present invention showing the trough mechanism protected by a housing '15' and a covering glazing '16'. In this embodiment, the absorbers in the V-trough apertures are fluid-conducting pipes '17'. These pipes have a blackened upper absorbing surface '18' which can be either a simple painted black surface or a solar selective radiation coating for repressing infrared radiation. Also shown are two types of precooling structural components for the ridges as utilized in the preferred embodiment of this collector. These precooling components serve as fluid-conducting means within the ridge structure and are in thermal contact with its side walls, and are specifically as shown, fluid-conducting tubes at the ridge base axes '19' which may serve as the support members for these axes, and fluid-conducting members '20' lining or actually forming a part of the lower ridge side wall area. This latter embodiment would be the most efficient because, as can be seen from the drawings of FIG. 1, the greatest proportion of energy lost to the ridge structure from multiple light reflections is in this lower ridge wall area. Available materials which might serve this function are light aluminum paneling with integral tubing or aluminized plastic fluid-conducting material.

An aiming device 24 is mounted so that its operative axis pivots, 25, in parallel with the pivot of the axes of the ridges 26. As previously stated, a number of commonly available aiming devices of different designs, as used in other tracking solar collectors, may be successfully used in the present invention. One such common design comprises two photo-sensitive elements, 34, and a shadowing structure, 35. When the operative axis of the aiming device 24 is aligned parallel with the incomming solar radiation, the photo-sensitive elements, 34, are equally shaded by the shadow structure 35. As the solar image moves off the axis of the aiming device, one of the photo-sensitive elements is illuminted while the other remains in shadow, thus creating a potential difference in an electrical circuit associated with these photo-sensitive elements that can be used to provide a controlling signal to the driving means, 33.

To accomplish the parallel pivoting of the axis of the aiming device with the axes of the ridges, the aiming device may be mounted on a support member, 27, that forms the axis of pivoting structure 28, having the same cross-sectional size and shape as the ridges and the same pivoting capability. Since this pivoting structure 28 need not be a ridge itself, it may be formed of a flexible wire having the same slippage capability around its support points as the ridge structures do around their base and apex support members. Tension must also be provided on the pivoting structure as shown by the vector arrow, in a like manner as tension is provided on the ridges.

The basic requirement is only that a structure be provided that will support the aiming device, 24, and pivot its operative axis in parallel with the axes of the ridges. This will be accomplished by the interconnecting means, 29, which can be either rods or wires which will force the pivoting structure 28 to pivot in parallel with the ridges when they are pivoted by the lateral motion of the ridge guiding member, 30. This guiding member is shown as a horizontally movable, 31, carriage with slots, 32, for engaging the ridge support members and allowing for their vertical motion as a required consequence of their horizontal motion. The guiding member is impelled by the driving means 33, most likely an electric motor, which in turn is controlled by information from the aiming device, 24, thus forming a servo feedback loop.

Figure 4:
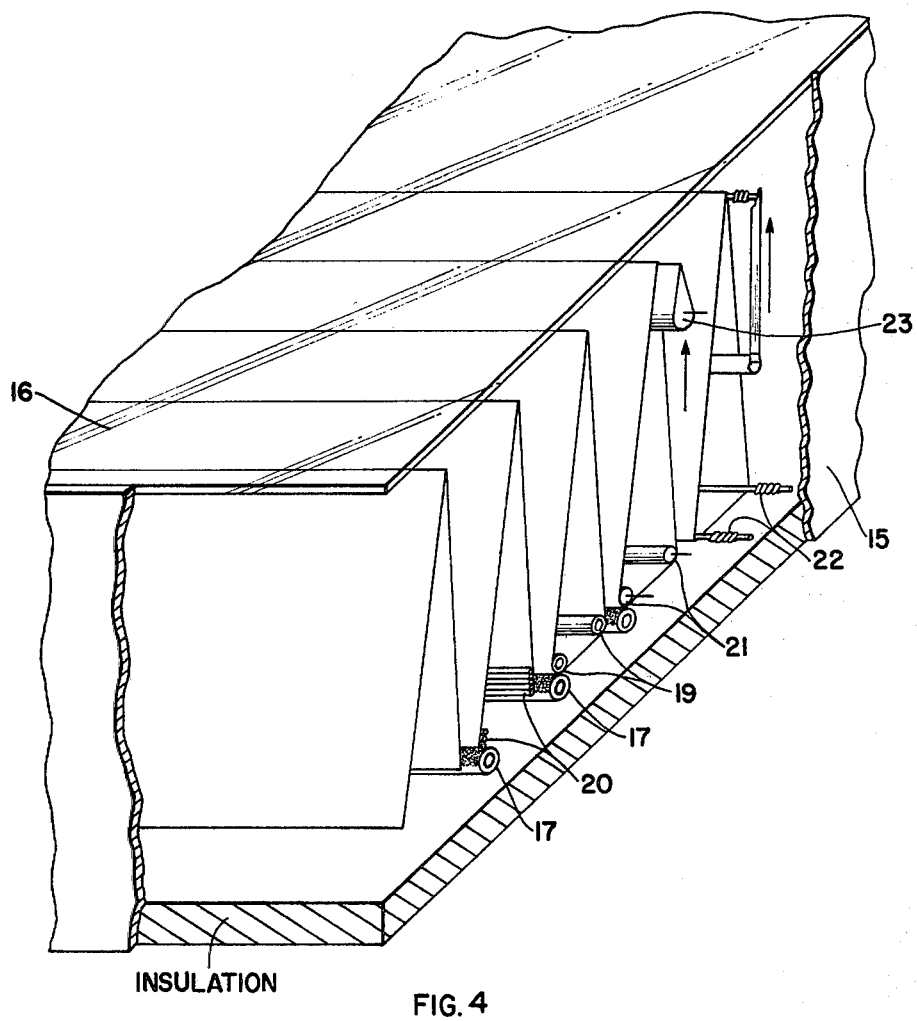
FIG. 4 is a cutaway perspective view of the present invention.

FIG. 4 is a cutaway perspective view of the same embodiment as FIG. 3, additionally showing a number of possibilities for ridge support members. There are rollers '21', spring-loaded wires '22', and knife edge '23'.

Since other modifications and changes will be apparent to those skilled in the art, this invention is not considered limited to the examples chosen for illustration, and covers all changes and modifications which do not constitute departures from the true spirit and scope of this invention.

I claim:

1. A tracking solar energy concentrator comprising: a plurality of parallel adjacent solar tracking ridges of inverted V-shape in cross-section, said ridges being spaced to form V-shaped troughs, each of said ridges having an apex axis edge and two base axis edges joined by two sides, support means for supporting each of said ridges at said apex and base axis edges, said sides formed of material having a highly light-reflective surface facing said troughs, said reflective material being of a flexibe nature to provide for slippage around said support means during tracking orientation, said support means also providing for slippage and pivoting of said reflective material around said support means during tracking orientation, means to provide tension upon said reflective material whereby the shape of said ridges is maintained throughout thermal fluctuations and tracking orientation, driving and guiding means for the simultaneous relative lateral and vertical displacement of each of said apex axis support means with respect to said base axes support means, said driving means and said pivotally mounting means such that the operative axis of the control means shifts with and remains substantially in parallel with the operative axis of the V-shaped troughs throughout tracking orientation.

2. The solar concentrator of claim 1 further including means for absorbing the solar radiation within the V-shaped troughs.

3. The solar concentrator of claim 2 further including means within said ridges for conducting fluid flow, said fluid-conducting-means in thermal contact with said ridge sides.

* * * * *